(12) United States Patent
Vermoesen et al.

(10) Patent No.: US 6,871,496 B2
(45) Date of Patent: Mar. 29, 2005

(54) ADJUSTABLE DUAL CENTER PORT COMPENSATION FOR MASTER CYLINDER

(75) Inventors: Michel J. Vermoesen, Miamisburg, OH (US); Byengsu Kim, Dayton, OH (US); John C. Layman, Trotwood, OH (US)

(73) Assignee: Delphi Technologies, Inc., Troy, MI (US)

( * ) Notice: Subject to any disclaimer, the term of this patent is extended or adjusted under 35 U.S.C. 154(b) by 32 days.

(21) Appl. No.: 10/423,629

(22) Filed: Apr. 25, 2003

(65) Prior Publication Data

US 2004/0211179 A1 Oct. 28, 2004

(51) Int. Cl.$^7$ ................................................ B60T 11/28
(52) U.S. Cl. ........................................ 60/589; 60/562
(58) Field of Search ................................ 60/562, 589

(56) References Cited

U.S. PATENT DOCUMENTS

| | | | |
|---|---|---|---|
| 4,550,567 A | * 11/1985 | Schaefer | ........................ 60/562 |
| 5,513,492 A | * 5/1996 | Anderson | ..................... 60/589 |
| 6,276,137 B1 | 8/2001 | Kottmyer et al. | |
| 6,311,492 B1 | * 11/2001 | Takayama et al. | ............ 60/562 |
| 6,360,540 B1 | 3/2002 | Kottmyer | |
| 6,422,013 B2 | 7/2002 | Dick et al. | |
| 6,422,661 B1 | 7/2002 | Shaw et al. | |
| 6,434,931 B1 | 8/2002 | Shaw et al. | |
| 6,453,670 B1 | 9/2002 | Kottmyer | |
| 6,490,964 B2 | 12/2002 | Buynacek | |
| 6,494,040 B2 | * 12/2002 | Pagot et al. | ................... 60/562 |
| 6,619,039 B2 | 9/2003 | Zehnder, II et al. | |

* cited by examiner

*Primary Examiner*—F. Daniel Lopez
*Assistant Examiner*—Michael Leslie
(74) *Attorney, Agent, or Firm*—Michael D. Smith

(57) ABSTRACT

A vehicle braking system master cylinder that can handle pressure pulses within the brake fluid of a vehicle braking system without the destruction of components internal to a master cylinder. A vehicle braking system master cylinder that allows for component subassembly external to the master cylinder and is self-aligning when assembled. Finally, a vehicle braking system master cylinder that allows for variable travel of the primary piston and the secondary piston within the master cylinder and greater fluid flow in the vehicle braking system.

14 Claims, 3 Drawing Sheets

ADJUSTABLE DUAL CENTER PORT COMPENSATION FOR MASTER CYLINDER

TECHNICAL FIELD OF THE INVENTION

The present invention relates, generally to a vehicle braking system. In particular, the invention relates to the fluid flow through of a master cylinder during Traction Control System (TCS) and Antilock Brake System (ABS) operating modes.

BACKGROUND OF THE INVENTION

The master cylinder is an integral part of the vehicle braking system. There are several designs of master cylinders in use with different fluid flow patterns to achieve customer needs.

ABS and TCS increase the need for proper flow of the brake fluid through the master cylinder. With the brakes applied and ABS mode initiated, the high-pressure piston cup of both the primary and secondary circuits are beyond the by-pass and therefore exposed to extrusion as sudden backpressure occurs. This phenomenon creates significant stress on key components within the master cylinder such as the high-pressure piston seals. Therefore, new bypass flow concepts have become necessary to accommodate the sudden backpressure sent to the master cylinder and prevent any damage to the high-pressure piston seals.

Several prior designs of vehicle braking system master cylinders can accommodate the pulsating brake fluid, however, internal components of these master cylinders are susceptible to being eroded more quickly, thereby affecting the life, durability and performance of the master cylinder. Another concern with prior designs of vehicle braking system master cylinders is the component stack aspect of these designs. Prior art designs provide for only one dedicated travel length and degree of fluid flow within the master cylinder. Finally, existing center compensation designs of the master cylinders have numerous small parts and are tedious to assemble, as they require proper alignment within the master cylinder that could contribute to assembly problems leading to first time quality concerns.

It would be desirable, therefore, to provide a master cylinder that overcomes these and other disadvantages.

SUMMARY OF THE INVENTION

One aspect of the invention provides a vehicle braking system master cylinder comprising a master cylinder body with a primary piston operably connected to a primary spring retainer. The primary spring retainer is connected to a primary center valve. The primary center valve is connected to a primary center valve stop. Within the connection of the primary center valve and the primary center valve stop is a biasing member operating on the primary center valve. Further, a primary biasing member is contained within the primary piston wherein the primary spring retainer operably connects with a flange aligning the primary piston with the master cylinder.

Another aspect of the invention provides a method for assembling a braking system. The method includes snap fitting a biased center valve onto a stopper to form a cassette, attaching the cassette to a biased retainer, and attaching the retainer to a piston to align the piston within a master cylinder.

Yet another aspect of the invention provides a vehicle braking system including a master cylinder, first and secondary pistons carried within the master cylinder, means for aligning the primary piston within a master cylinder and means for aligning the secondary cylinder within the master cylinder.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENT

Figure 1:
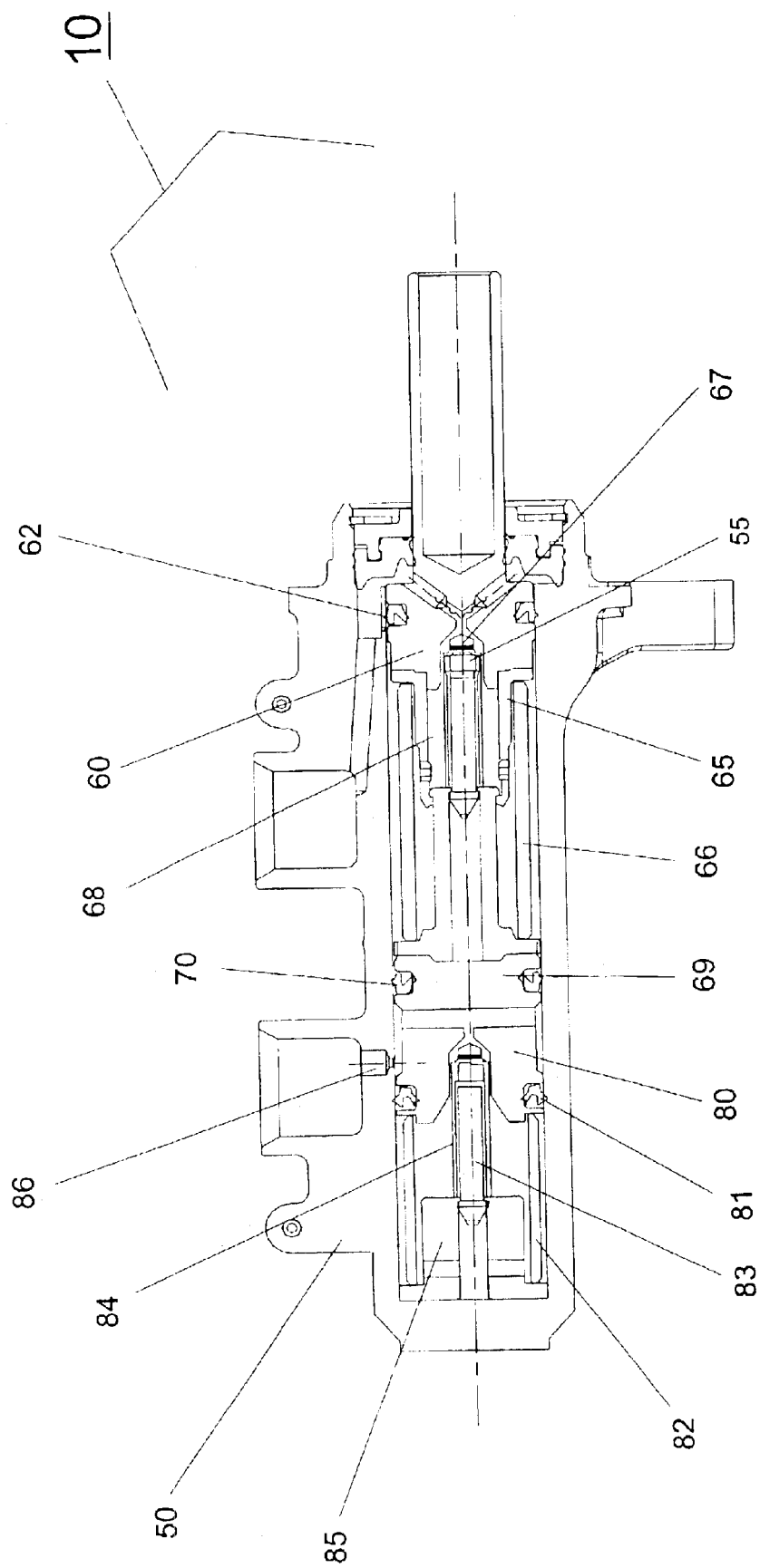
FIG. 1 is a cross-sectional view of one embodiment of the master cylinder in accordance with the invention.
Figure 2:
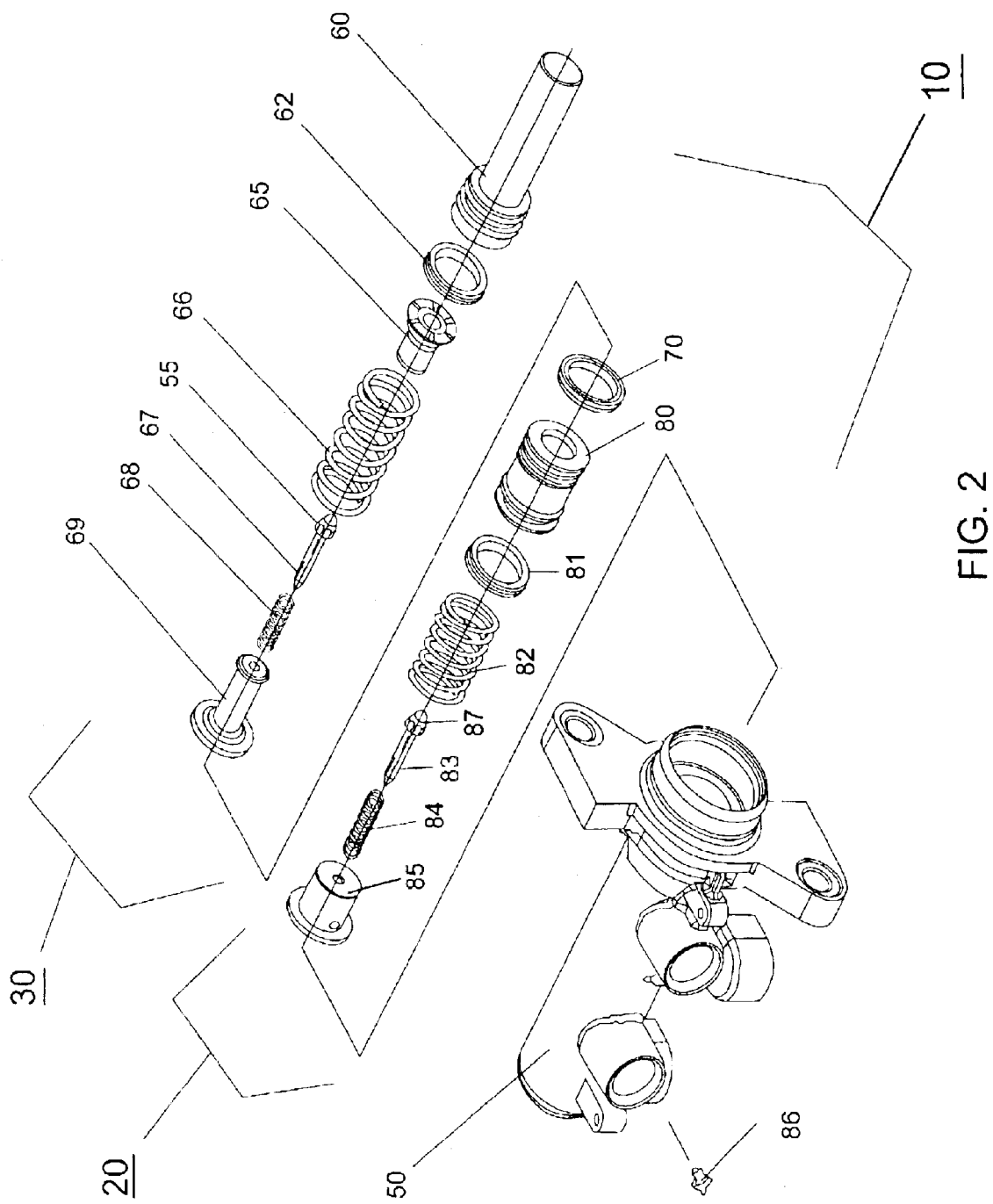
FIG. 2 is an exploded perspective view of the master cylinder illustrated in FIG. 1 in accordance with the invention.

Referring to FIGS. 1 and 2, FIG. 1 illustrates a cross sectional view of one embodiment of a master cylinder 10 and FIG. 2 is an exploded view of one embodiment of the master cylinder 10 illustrated in FIG. 1. Master cylinder 10 includes master cylinder body 50, center port compensation (CPC) pin 86 secondary piston cassette assembly 20 and primary piston cassette assembly 30.

Master cylinder 10 is comprised of the master cylinder body 50 and center port compensation ("CPC") pin 86. The master cylinder body 50 may be a body made of aluminum. The CPC pin 86 may be a pin made of aluminum, steel, or nylon.

As shown most clearly in FIG. 2, secondary piston cassette assembly 20 comprises secondary center valve stop 85, secondary center valve spring 84, secondary center valve 83, secondary spring 82, second primary seal 81, and secondary piston 80. The secondary center valve spring 84 and the secondary spring 82 may be springs constructed of steel wire. The secondary piston 80 may be a piston made of aluminum. The secondary center valve stop 85 may be a valve stop made of aluminum or steel.

The secondary piston cassette assembly 20 is assembled by placing the secondary center valve 83 within the secondary center valve spring 84 prior to snap fitting the secondary center valve 83 into the secondary center valve stop 85. The attached secondary center valve stop 85, the secondary center valve 83 and the secondary center valve spring 84 are then placed within the master cylinder body 50. The secondary spring 82 is then installed into the master cylinder body 50 followed by the second primary seal 81 and the secondary piston 80. After the secondary piston 80 has been installed, the CPC pin 86 is snap fitted into the master cylinder body 50 to hold the secondary piston cassette assembly 20 in place within the master cylinder body 50.

After the secondary piston cassette assembly 20 has been inserted into the master cylinder body 50, and the CPC pin 86 has been snapped into place within the master cylinder body 50, a secondary seal 70 is inserted within the master cylinder body 50. The secondary seal 70 may be a seal made of EP rubber. After the secondary cassette assembly 20 and the secondary seal 70 have been inserted within the master cylinder body 50, the primary piston cassette assembly 30 is inserted into the master cylinder body 50.

As shown most clearly in FIG. 2, the primary piston cassette assembly 30 includes primary center valve stop 69, a primary center valve spring 68, primary center valve 67, primary spring 66, primary spring retainer 65, primary seal 62, and primary piston 60. The primary center valve stop 69 may be a valve stop made of aluminum or steel. The primary piston 60 may be a piston made of aluminum. The primary center valve spring 68 and the primary spring 66 may be springs constructed of steel wire. The primary seal 62 may be a seal made of EP rubber. The primary spring retainer 65 may be a retainer made of, for example, glass filled nylon.

The primary piston cassette assembly 30 is assembled by inserting the primary center valve 67 within the primary center valve spring 68 prior to snap fitting the primary center valve 67 into the primary center valve stop 69. The primary center valve 67, the primary center valve spring 68 and the primary center valve stop 69 partial assembly is then inserted into the primary spring 66 before the second end of the primary center valve 67 is snap fitted into the primary spring retainer 65. The primary seal 62 is installed onto the primary piston 60 and the second end of the primary spring retainer 65 is then operably connected to the primary piston 60 comprising the full primary piston cassette assembly 30.

Direct insertion of both the secondary cassette assembly 20 and the primary cassette assembly 30, without the need for cassette assembly alignment, allows easier master cylinder assembly. Further, the design of the master cylinder body 50 allowing for direct snap fitting of the CPC pin 86 has eliminated the need for primary piston and secondary piston alignment pins used in prior master cylinder designs.

Another aspect of the invention is a method of assembly that requires no alignment of the internal components within the master cylinder during assembly. As illustrated in FIG. 1 and FIG. 2 and described above, there are two subassemblies, primary cassette assembly 30 and secondary cassette assembly 20 that when fully assembled are inserted directly into the master cylinder body 50 without the need for cassette assembly alignment. Further, the design of the master cylinder body 50 allows for direct snap fitting of the CPC pin 86 and eliminates the need for primary piston and secondary piston alignment pins used in prior master cylinder designs.

Figure 3:
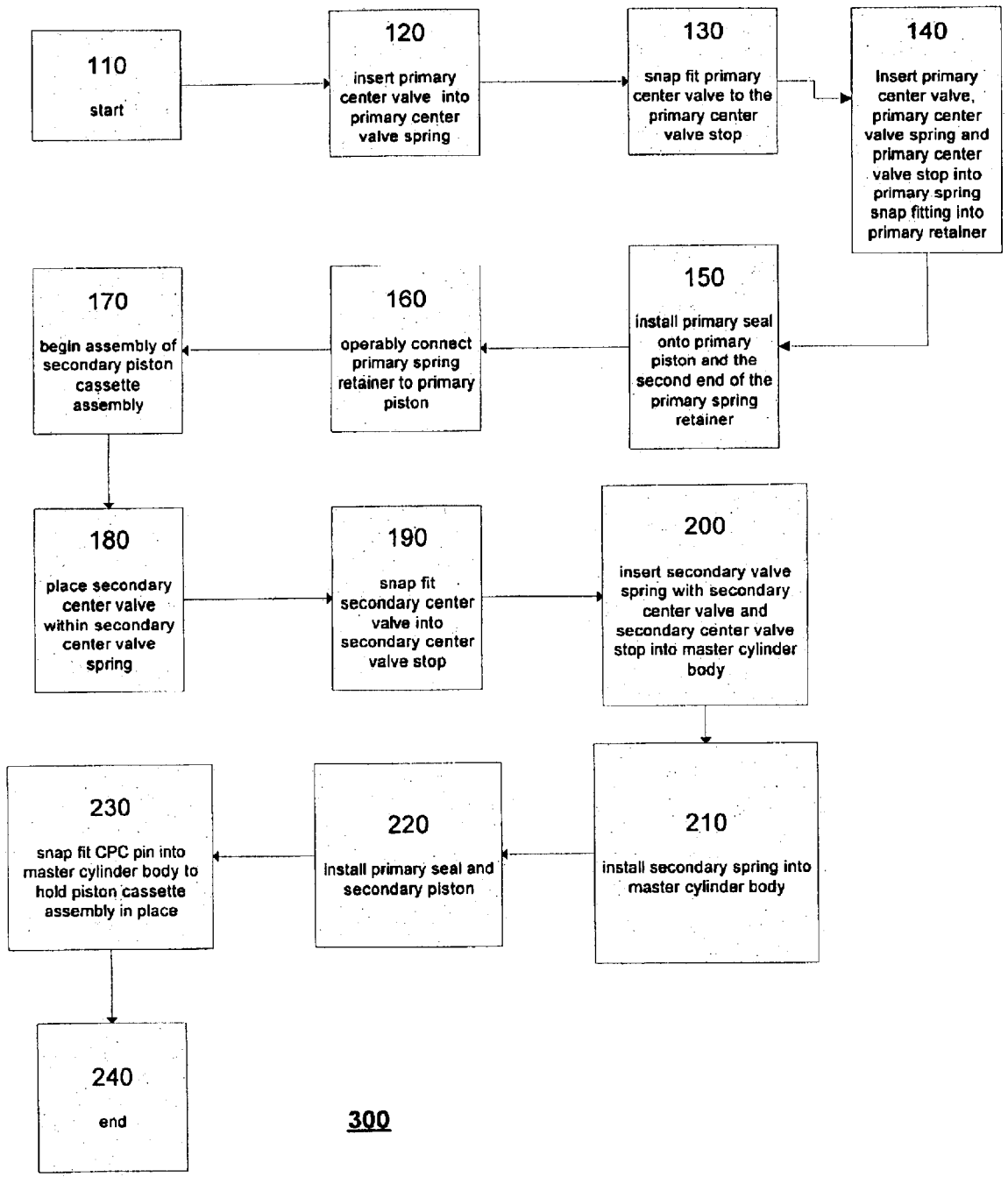
FIG. 3 is a flow chart diagram showing the method of assembling the master cylinder illustrated in FIG. 1 and FIG. 2 in accordance with the invention.

FIG. 3 illustrates a flow chart depicting the method 300 for assembling the master cylinder. The initial point of assembly or start 110 is followed by inserting the primary center valve into the primary center valve spring 120. The primary center valve is then snap fitted into the primary center valve stop 130. The primary center valve, primary center valve spring and primary center valve stop subassembly is then inserted within the primary spring and snap fitted into the primary spring retainer 140. The primary seal is then installed onto the primary piston and the second end of the primary spring retainer 150. The primary spring retainer is then operably connected to the primary piston 160 comprising the full assembly of the primary piston cassette. The initial step of assembling the secondary piston cassette assembly 170 is followed by placing the secondary center valve within the secondary center valve spring 180. The secondary center valve is then snap fitted into the secondary center valve stop 190. The secondary center valve stop, the secondary center valve and the secondary center valve spring are then placed within the master cylinder body 200. The secondary spring is then installed into the master cylinder body 210. The primary seal and the secondary piston are then inserted into the master cylinder body 220. The CPC pin is then snap fitted into the master cylinder body to hold the secondary piston cassette assembly in place 230. The end step 240 shows the completion of the method of assembly.

An additional aspect of the invention provides for a variable travel length within the master cylinder body 50. FIG. 1 illustrates an embodiment of the invention where the secondary center valve 83 provides the interconnection between the secondary center valve stop 85 and the secondary piston 80 and the primary center valve 67 provide the interconnection between the primary center valve stop 69 and the primary spring retainer 65. By altering the length of either the primary center valve 67 or the secondary center valve 83, or both, the actual travel length of the primary piston cassette assembly 30 and the secondary piston cassette assembly 20 can be predetermined by the preference of the manufacturer of the master cylinder brake assembly. Additionally, FIG. 1 illustrates an embodiment of the invention where the secondary center valve 83 and the primary center valve 67 have on one end a plurality of flow grooves 87 and 55, respectively, which allow for internal fluid flow within the master cylinder body 50. The plurality of flow grooves in the secondary center valve 83 and the primary center valve 67 which are cut deeply into the valve material assure adequate brake fluid flow thereby compensating for the sudden internal flow of brake fluid within the master cylinder body 50 caused by the vehicle anti-locking brake design found in many vehicles. The flow grooves 87 and 55, respectively, on secondary center valve 83 and primary center valve 67 provide a pathway for the sudden onset of brake fluid flow during the ABS mode of braking thereby protecting the internal components of master cylinder 10, such as the primary seal 81 or secondary seal 82, from being damaged. The secondary center valve 83 and the primary center valve 67 may be valves made of nylon 6/6 or EP rubber seat.

While the embodiments of the invention disclosed herein are presently considered to be preferred, various changes and modifications can be made without departing from the spirit and scope of the invention. The scope of the invention is indicated in the appended claims, and all changes that come within the meaning and range of the equivalents are intended to be embraced therein.

What is claimed is:

1. A vehicle braking system comprising:
  a master cylinder;
  a primary piston;
  a primary spring retainer operably connected to one end of the primary piston;
  a primary center valve operably attached at a first end to the primary spring retainer;
  a primary center valve stop operably attached at one end to a second end of the primary center valve;
  a center valve-biasing member operably contacting the primary center valve and the primary center valve stop;
  a primary biasing member operably contacting the primary center valve stop and the primary spring retainer, wherein the primary spring retainer mates with a flange to align the primary piston within the master cylinder.

2. The system of claim 1 further comprising:
  a secondary piston contacting the primary center valve stop;
  a secondary center valve including a first end portion received in the secondary piston;

a secondary center valve stop operably attached at one end to a second end portion of the secondary center valve;

a secondary center valve-biasing member operably contacting the secondary center valve and the secondary center valve stop;

a secondary biasing member operably contacting the secondary center valve stop and the secondary piston, wherein the secondary center valve mates with the secondary piston to align the secondary piston within the master cylinder;

a center port compensation pin inserted into master cylinder to hold secondary piston in place.

3. The system of claim 1 further comprising a primary piston seal operably attached to the master cylinder and contacting the primary piston.

4. The system of claim 1 wherein the primary center valve is snap-fitted to the primary spring retainer and the primary center valve stop.

5. The system of claim 1 wherein the primary center valve comprises flow grooves.

6. The system of claim 1 wherein the primary center valve comprises a snap head.

7. The system of claim 1 wherein the primary center valve comprises a nylon material.

8. The system of claim 2 wherein the secondary center valve is snap-fitted to the secondary center valve stop.

9. The system of claim 2 wherein the secondary center valve comprises flow grooves.

10. The system of claim 2 wherein the secondary center valve comprises a snap head.

11. The system of claim 2 wherein the center port compensation pin comprises a wedge-shaped pin snapped into the master cylinder to retain the secondary piston.

12. A method for assembling a braking system, the method comprising:

snap-fitting a biased center valve onto a stopper to form a first cassette;

attaching the first cassette to a biased retainer;

attaching the retainer to a piston to align the piston within a master cylinder.

13. The method of claim 12 further comprising: receiving a second biased cassette within a second piston.

14. A vehicle braking system comprising:

a master cylinder;

primary and secondary pistons disposed within the master cylinder;

means for aligning the primary piston within the master cylinder; and means for aligning the secondary piston within the master cylinder;

wherein at least one of said primary and secondary pistons includes a center valve having a plurality of grooves for damping vehicle braking system fluid backpressure.

* * * * *